G. P. CLARK.
WRINGER ROLLS.
No. 179,399.
Patented July 4, 1876.
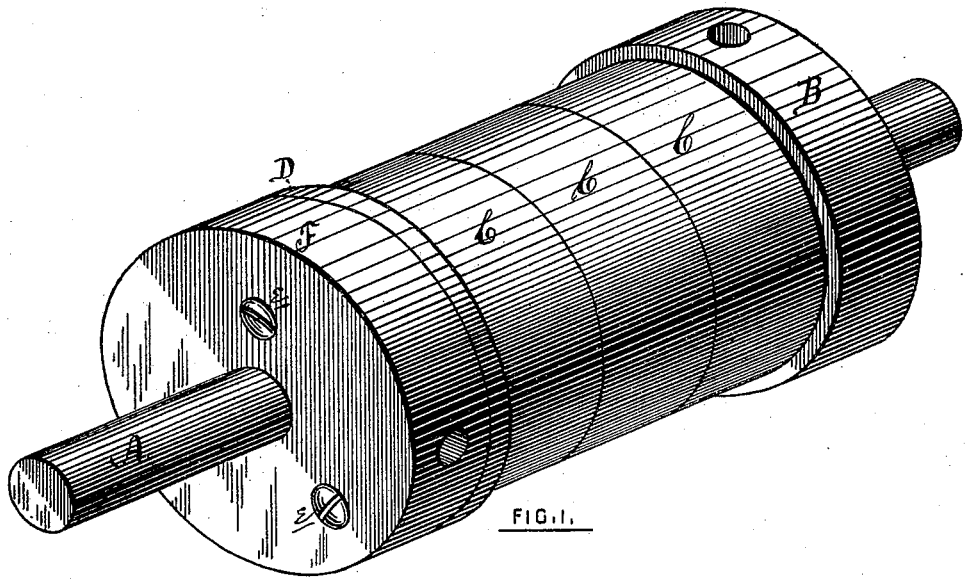
FIG. 1.
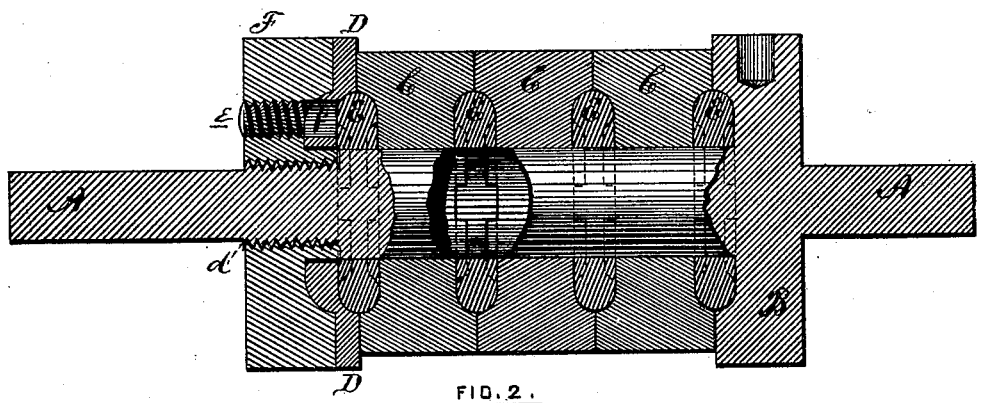
FIG. 2.
FIG. 3.
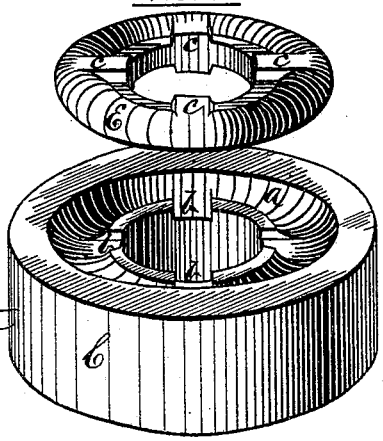
FIG. 4.
WITNESSES.
Hiram Warburton
J. L. Anderson
INVENTOR.
Geo. P. Clark.

UNITED STATES PATENT OFFICE.

GEORGE P. CLARK, OF WINDSOR LOCKS, CONNECTICUT.

IMPROVEMENT IN WRINGER-ROLLS.

Specification forming part of Letters Patent No. 179,399, dated July 4, 1876; application filed April 5, 1876.

*To all whom it may concern:*

Be it known that I, GEO. P. CLARK, of Windsor Locks, in the county of Hartford and State of Connecticut, have invented certain new and useful Improvements in Rolls for Wringing-Machines; and I do hereby declare that the following specification, taken in connection with the drawings making a part of the same, is a full, clear, and exact description thereof.

The improved roller hereinafter described is particularly intended for use in large power-driven machines used in bleacheries and dye-works; but it is also adapted for machines used for domestic purposes, as well as for the various purposes for which squeezing-rollers are used in the arts.

Wringing-rolls have heretofore been made of elastic sectional rings, with intermediate metallic sections, and also with intermediate wads between the metallic and the elastic sections. In such rolls the elastic sections have always heretofore had smooth sides, and the metallic sections were made to engage therewith by having the raised ribs or shoulders formed in the metallic sections forced into the elastic sections, or into the wad interposed between them.

My invention is embodied in a structure which consists of a series of rings of rubber, or of the compounds of rubber, or of other suitable material for a squeezing-roller arranged upon a central shaft with metallic vertebræ between such rings, and articulated by means of them, the ends of the roll proper being also similarly articulated with metallic flanges or disks connected with the roller-shaft, and the several sections composing the roll being compressed upon each other and clamped by suitable devices between the end flanges.

In the drawings, A represents the metallic shaft of the roll, which is furnished near one of the end bearings with a solid permanent head or flange, B. C C represent the rings of rubber or other material which compose the roll proper. Each of these rings or sections is molded or formed as shown at Fig. 4—that is to say, its opposite sides are made with a concave cavity $a$, in the bottom of which are radial chambers $b$. The inner face of the flange B is similarly formed, and so also is the inner face of a metallic plate or washer, D, which is placed at the other end of the roll, and opposite to the fixed flange B, as shown at Fig. 2. E, Fig. 3, represents one of the metallic vertebræ, which are articulated, when placed on the shaft A, with the rings C, and the ones at the ends of the roll with the flange-head B and with the washer D, respectively, as seen in sectional view at Fig. 2. These vertebræ have their opposite faces convex, or corresponding in form with the concave recesses in the rings C, and in the head-flange B and washer D. They have also on their faces raised ribs or lugs $c$, which fit into the radial channels $b$ of such rings, flange, and washer, respectively.

Any desired number of rings, C, formed, as described, to make a roll of the length required, are placed, as shown at Fig. 2, upon the roller-shaft, which is provided with a permanent head or flange, B, and the said rings are combined with the said flange and with each other, as shown in the said figure. The washer or circular plate D is then placed over the end of the last ring composing the series, and combined with the last vertebral piece in the series. The several rings are now to be compressed hard against each other, and clamped between the flange B and the washer or plate D. This is effected by the circular nut F, which forms a metallic head to the roll corresponding with the head B, and is fitted to turn upon a screw-thread, $d$, on the shaft A, so that any desired degree of pressure upon sections composing the roll may be obtained. The nut, after it has effected the compress, may be held in place by means of screw-bolts $e\ e\ e$, the ends of which extend into and occupy corresponding holes $f$ in the washer D. The holes $g$ and $h$ are simply for the insertion of levers to obtain the necessary purchase for screwing up the nut F.

By this mode of construction heavy rolls for wringing, squeezing, or other similar machines used to express liquids from cloths, &c., can be easily and cheaply repaired when any one or more of the sections composing it becomes worn. The several sections being articulated with each other, and secured on the shaft, as described, cannot turn upon the shaft, and the capacity which exists for compressing the several sections, and clamping them together, closes the joints between the sections, and renders the roll practically as impervious to water as if it were made of continuous rubber without joints.

What I claim as my invention, and desire to secure by Letters Patent, is—

1. A roller for wringing-machines, composed of sectional rings articulated together and combined with the shaft, substantially as described.

2. A roller composed of elastic sectional rings, articulated together by means of intermediate metallic vertebræ, and mounted on a shaft, provided with end flanges for compressing the elastic rings, substantially as described.

G. P. CLARK.

Witnesses:
   HIRAM WARBURTON,
   G. S. ANDERSON.